Z. T. LEE.
Corn and Cotton Seed-Planter.

No. 221,241.        Patented Nov. 4, 1879.

Witnesses:
J. W. Garner
Wm. W. Mortimer

Inventor:
Z. T. Lee,
per
F. A. Lehmann,
Att'y

UNITED STATES PATENT OFFICE.

ZACHARY TAYLOR LEE, OF PLATTSBURG, MISSISSIPPI.

IMPROVEMENT IN CORN AND COTTON-SEED PLANTERS.

Specification forming part of Letters Patent No. 221,241, dated November 4, 1879; application filed September 24, 1879.

*To all whom it may concern:*

Be it known that I, ZACHARY T. LEE, of Plattsburg, in the county of Winston and State of Mississippi, have invented certain new and useful Improvements in Planters; and I do hereby declare the following to be a full, clear, and exact description of the invention, such as will enable others skilled in the art to which it pertains to make and use it, reference being had to the accompanying drawings, which form part of this specification.

My invention relates to an improvement in corn and cotton-seed planters; and it consists in the combination of the driving-wheel shaft having a crank on one end and a slotted connecting-rod, which unites the said crank with a crank on the feed-cylinder, the connecting-rod having a recess at each end of its slot, so that should any attempt be made to move the machine backward the guide-pin will catch in one of the notches and at once stop any backward movement of the feed-cylinder, and thus prevent the waste of grain, as will be more fully described hereinafter.

The accompanying drawings represent my invention.

Figure 1:
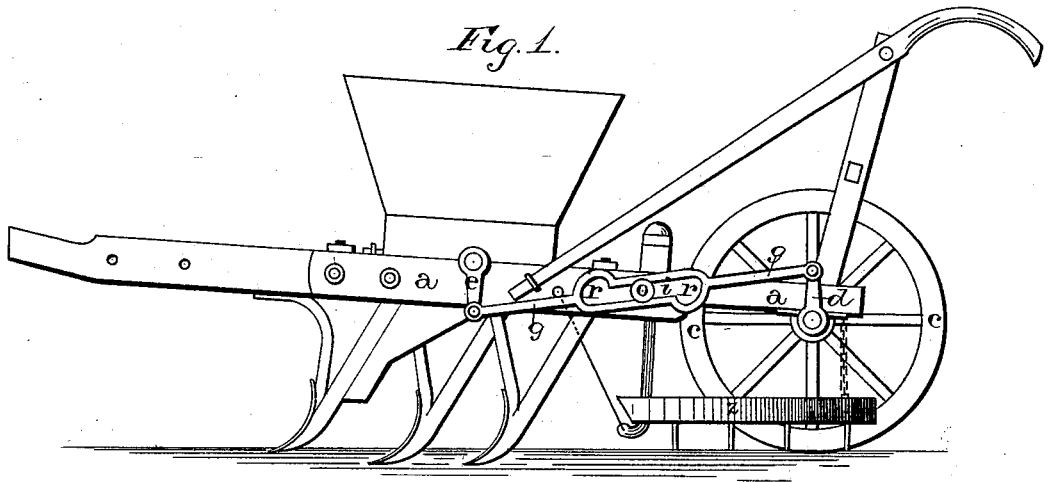
Figure 2:
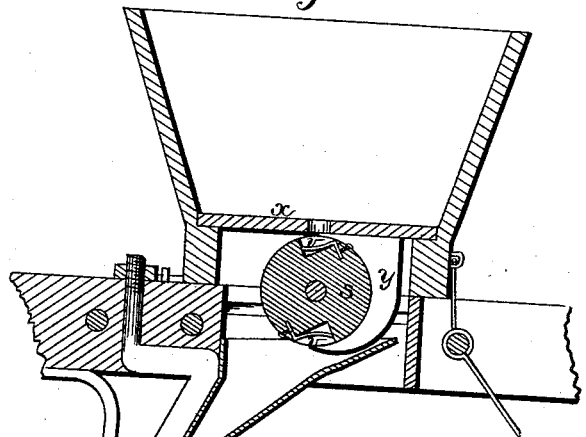

Figure 1 is a side elevation of my invention. Fig. 2 is a longitudinal section of the machine, taken through the seed-box; and Fig. 3 is a detail view.

$a$ represents the side beam of the frame, and $c$ the driving-wheel, which is journaled in the rear end of the frame in the usual manner. On one end of the shaft of this wheel is formed a crank, $d$, and to this crank and the crank $e$ of the feed-cylinder is attached the connecting-rod $g$, for the purpose of giving the cylinder a rotary motion as the wheel revolves. In this connecting-rod is made the slot $i$, through which the guide-pin $o$ passes, and at each end of the slot is made a notch or recess, $r$, so shaped that when the driving-wheel begins to turn back, when turning the machine at the end of the row or at any other time, the guiding-pin at once catches in one of the notches and prevents the cylinder from turning backward, and thus prevents wasting the grain. The notches, when the machine is moving regularly forward, do not in any manner interfere with any of the working parts, but lock the cylinder as soon as any backward motion is made, and thus no grain is lost in moving the machine backward or in turning it around.

The cylinder $s$ is provided with a suitable number of recesses to receive the grain from the hopper above, and in these recesses are placed the springs $v$, which form the bottoms of the recesses, so as to give sufficiently, as the cylinder revolves, to prevent the grains from being broken, or any part of the machine from being clogged or injured. Secured to the under side of the bottom $x$ of the hopper is the curved arm $y$, which fits snugly around the rear side of the cylinder and serves to clear away any surplus of grain from the recesses.

Figure 3:
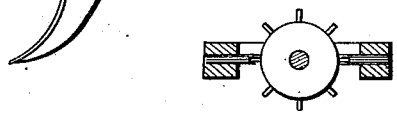

When cotton-seed is being planted a cylinder like the one shown in Fig. 3 is used. When the seed-box and connecting-rod are removed and the harrow $z$ attached, a cultivator is formed.

Having thus described my invention, I claim—

1. In a planter, the combination of the driving-wheel and its crank, the feed-cylinder and its crank, and the connecting-rod $g$, having the slot $i$, and recess or recesses $r$, whereby the feed-cylinder is prevented from turning backward, substantially as shown.

2. A seed-cylinder, $s$, having the springs $v$, placed in the bottoms of the recesses, substantially as described.

In testimony that I claim the foregoing I have hereunto set my hand this 12th day of July, 1879.

ZACHARY TAYLOR LEE.

Witnesses:
C. J. MILLER,
J. C. HOLDER.